(12) United States Patent
Nishiyama

(10) Patent No.: US 6,347,225 B1
(45) Date of Patent: Feb. 12, 2002

(54) SELECTIVE CALL RESPONSE RADIO TELEPHONE SYSTEM AND METHOD FOR PROVIDING APPROPRIATE RESPONSES TO INCOMING CALLS TO A RADIO TELEPHONE

(75) Inventor: Kohei Nishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/273,790

(22) Filed: Jul. 12, 1994

(30) Foreign Application Priority Data

Jul. 12, 1993 (JP) ............................................. 5-171509

(51) Int. Cl.$^7$ ................................................. H04Q 7/20
(52) U.S. Cl. ........................ 455/412; 455/415; 455/550; 379/142.06
(58) Field of Search ............................. 379/56, 57, 58, 379/59, 67, 61, 142, 127, 127.01, 142.04, 142.06, 142.07; 455/33.1, 54.1, 412, 413, 415, 461, 550; 340/825.44, 7.1

(56) References Cited

U.S. PATENT DOCUMENTS

| | | | | |
|---|---|---|---|---|
| 4,661,972 A | * | 4/1987 | Kai ............................... | 379/57 |
| 4,876,740 A | * | 10/1989 | Levine et al. ............... | 455/33.1 |
| 4,906,989 A | * | 3/1990 | Kasugai ........................ | 379/56 |
| 4,941,167 A | * | 7/1990 | Cannalte et al. ......... | 379/142 X |
| 4,942,598 A | * | 7/1990 | Davis .......................... | 379/57 |
| 4,961,216 A | * | 10/1990 | Baehr et al. .................. | 379/57 |
| 4,985,913 A | | 1/1991 | Shalom et al. | |
| 5,001,743 A | * | 3/1991 | Lenaerts ...................... | 379/67 |
| 5,003,576 A | * | 3/1991 | Helferich ................... | 379/56 X |
| 5,128,980 A | * | 7/1992 | Choi ........................... | 379/57 |
| 5,148,473 A | * | 9/1992 | Freeland et al. ............. | 379/57 |
| 5,153,582 A | * | 10/1992 | Davis .................... | 340/825.44 |
| 5,327,486 A | * | 7/1994 | Wolff et al. ............... | 379/58 X |
| 5,329,578 A | * | 7/1994 | Brennan et al. ............. | 379/59 |
| 5,444,761 A | * | 8/1995 | Nagashima ................... | 379/58 |
| 5,473,671 A | * | 12/1995 | Partridge, III .............. | 379/59 |
| 5,475,739 A | * | 12/1995 | Norimatsu ................ | 379/58 X |
| 5,559,860 A | * | 9/1996 | Mizikovsky ............ | 379/142 X |

FOREIGN PATENT DOCUMENTS

| | | |
|---|---|---|
| EP | 0330856 | 9/1989 |
| JP | 63245047 | 10/1988 |

* cited by examiner

Primary Examiner—Nay Maung
(74) Attorney, Agent, or Firm—Sughrue Mion, PLLC

(57) ABSTRACT

A telephone number memory stores telephone numbers which are divided into telephone number groups, and a response message memory stores response messages corresponding to the telephone number groups. In the automatic response mode, when a call is generated, a telephone number of a caller is checked as to whether the telephone number is stored in the telephone number memory, and, when the same telephone number is found therein, a response message of the telephone number group, to which the received telephone number belongs, is transmitted to the caller.

15 Claims, 3 Drawing Sheets

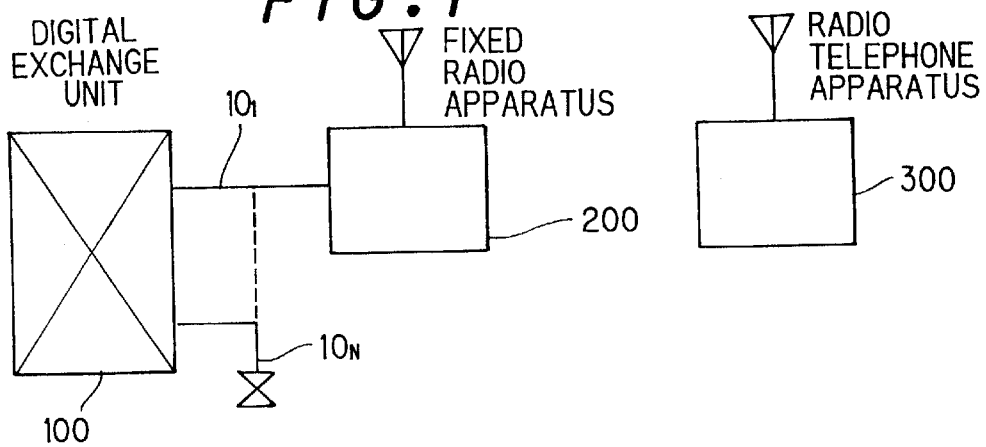
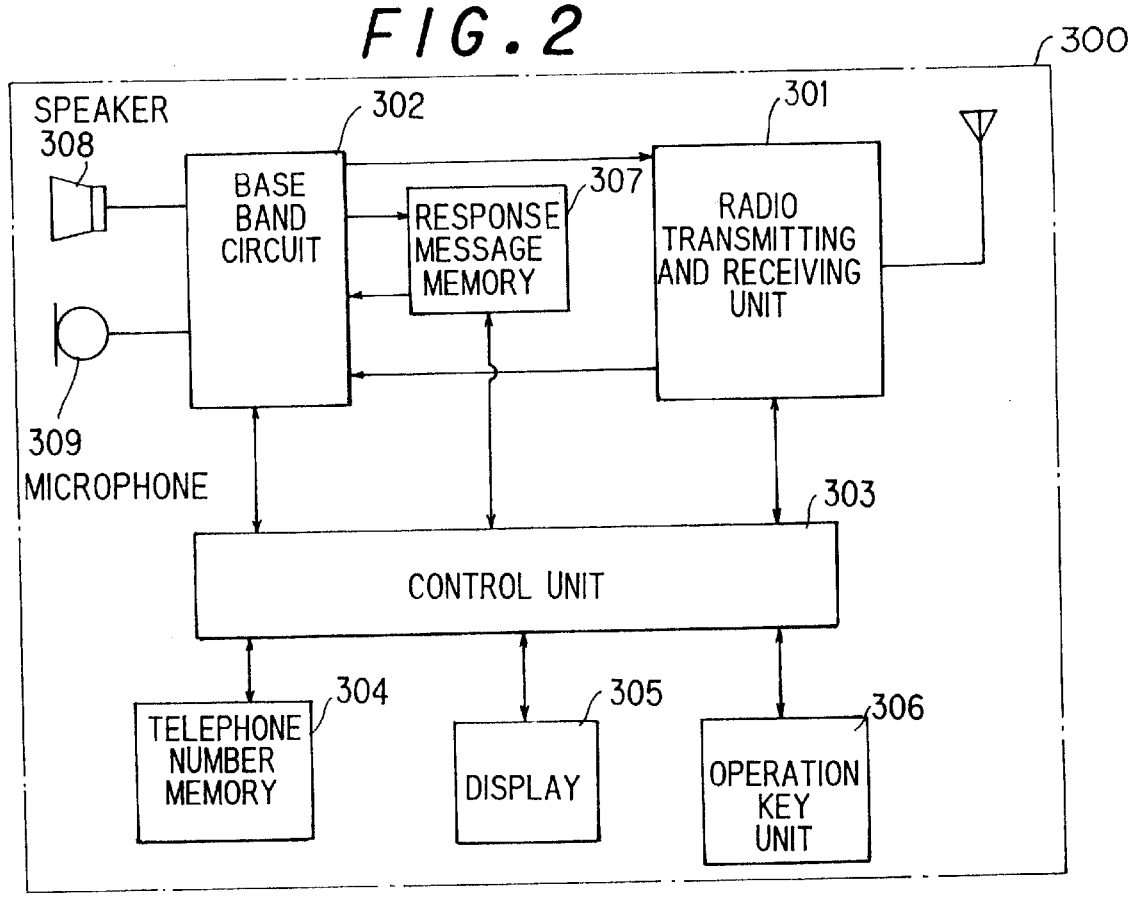

SELECTIVE CALL RESPONSE RADIO TELEPHONE SYSTEM AND METHOD FOR PROVIDING APPROPRIATE RESPONSES TO INCOMING CALLS TO A RADIO TELEPHONE

FIELD OF THE INVENTION

The invention relates to a radio telephone system, and more particularly to, a telephone responding system in which a response message is selected dependent on a telephone number of a caller from plural stored response messages.

BACKGROUND OF THE INVENTION

A conventional radio telephone system has been described in Japanese Patent Kokai No. 63-245047. In the conventional radio telephone system, a response message such as instruction, by which a caller is instructed to input a telephone number of the caller by using keys, is transmitted via a radio telephone line from, for instance, a car telephone set of a callee to a telephone set of the caller, when the callee who is, for instance, a car driver is outside a car, and, therefore, no one is inside the car. Thus, the caller operates key to input his telephone number to be transmitted to the car telephone set, so that the transmitted telephone number is stored in a RAM of the car telephone set. Then, the car telephone set read a telephone number of a pager (pocket bell) carried by the car driver from the RAM, and dials the pager's telephone number to call the car driver carrying the pager, so that the pager is connected to the car telephone set by a radio telephone line.

Then, the telephone number of the caller is read from the RAM in the car telephone set to be transmitted to the pager. Thus, the car driver which is outside the car is informed that the caller has telephoned him during his absence from the car, and the telephone number of the caller is displayed on a display of the pager.

In the conventional radio telephone system, however there is a disadvantage in that a telephone set for an absent callee can not respond to a caller by a response message which is appropriate dependent on who the caller is. In other words, the same response message is allocated to different callers having different relations to the callee.

SUMMARY OF THE INVENTION

Accordingly, it is an object of the invention to provide a radio telephone system in which a response message is selected from plural response messages dependent on who a caller is.

It is a further object of the invention to provide a radio telephone system in which plural response messages are stored in a telephone set for a callee who may be absent at the time of receiving a call.

It is a still further object of the invention to provide a radio telephone system in which a telephone set for an absent callee responds to a caller in accordance with a response message which is most appropriate to the caller by selecting one from plural response messages stored therein.

According to the invention, a radio telephone system, comprises:

a radio telephone apparatus which comprises:

a radio telephone set circuit for transmitting a signal to a fixed radio apparatus and receiving a signal therefrom;

a response message memory for storing at least one response message;

a telephone number memory for storing at least one telephone number and at least one telephone group for the at least one telephone number; and a control unit for controlling the radio telephone set circuit to operate in signal transmitting and receiving modes;

wherein the control unit compares a telephone number of a caller included in information received from the fixed radio apparatus with a telephone number stored in the telephone number memory in an automatic response mode, and, when the telephone number of the caller is coincident with the telephone number stored, the control unit read a corresponding response message to a telephone number group of the telephone number stored from the response message memory, and controls the radio telephone set circuit to transmit the corresponding response message via the fixed radio apparatus to the caller.

BRIEF DESCRIPTION OF THE DRAWINGS

The invention will be explained in more detail in conjunction with appended drawings, wherein:

FIG. 1 is a block diagram showing a radio telephone system in a preferred embodiment according to the invention, FIG. 2 is a block diagram showing a radio telephone set included in the preferred embodiment as shown in FIG. 1.

DESCRIPTION OF THE PREFERRED EMBODIMENTS

Figure 3:
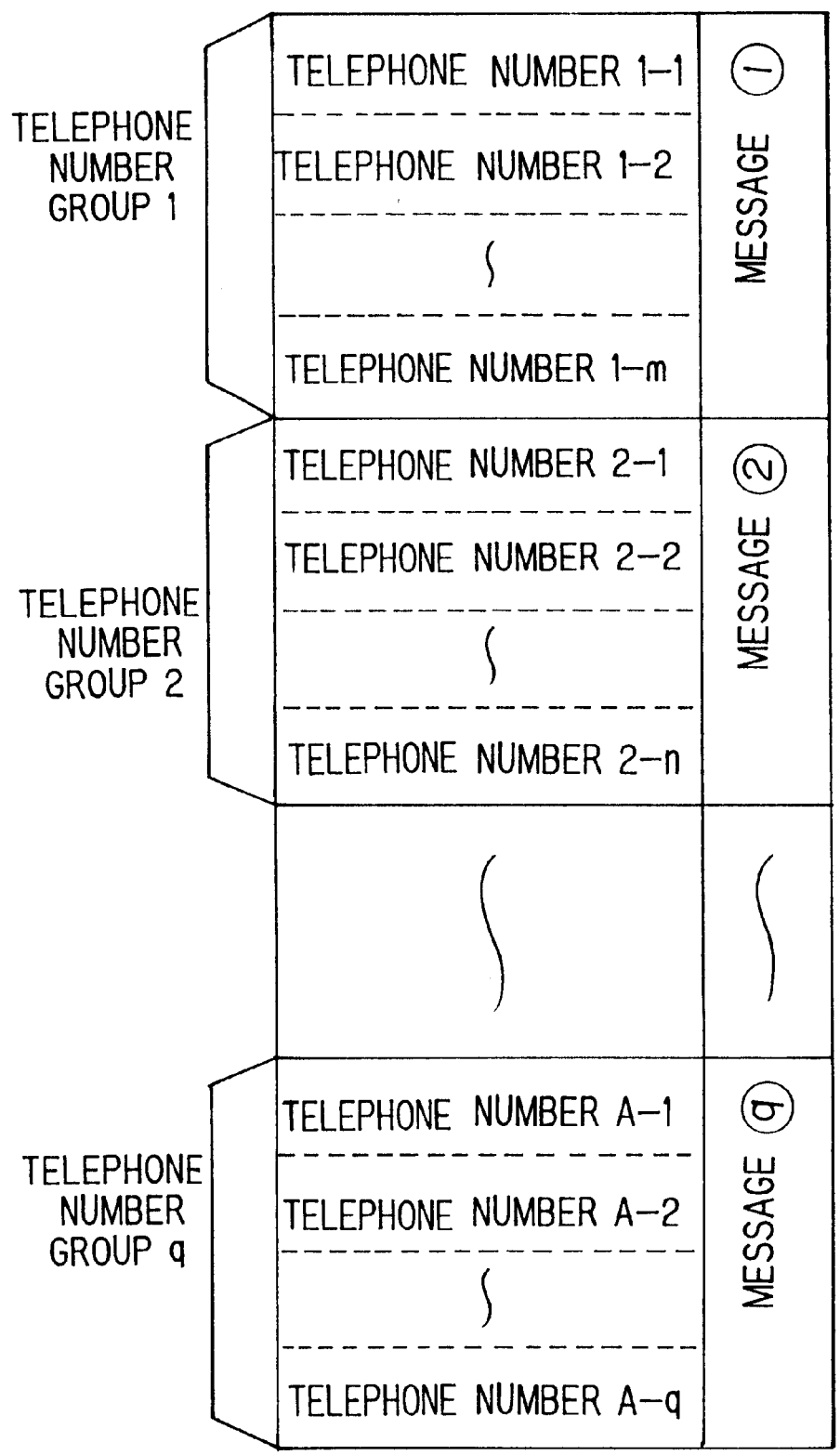
FIG. 3 is an explanatory diagram showing a memory for storing telephone numbers and response messages used in the radio telephone set as shown in FIG. 2.
Figure 4:
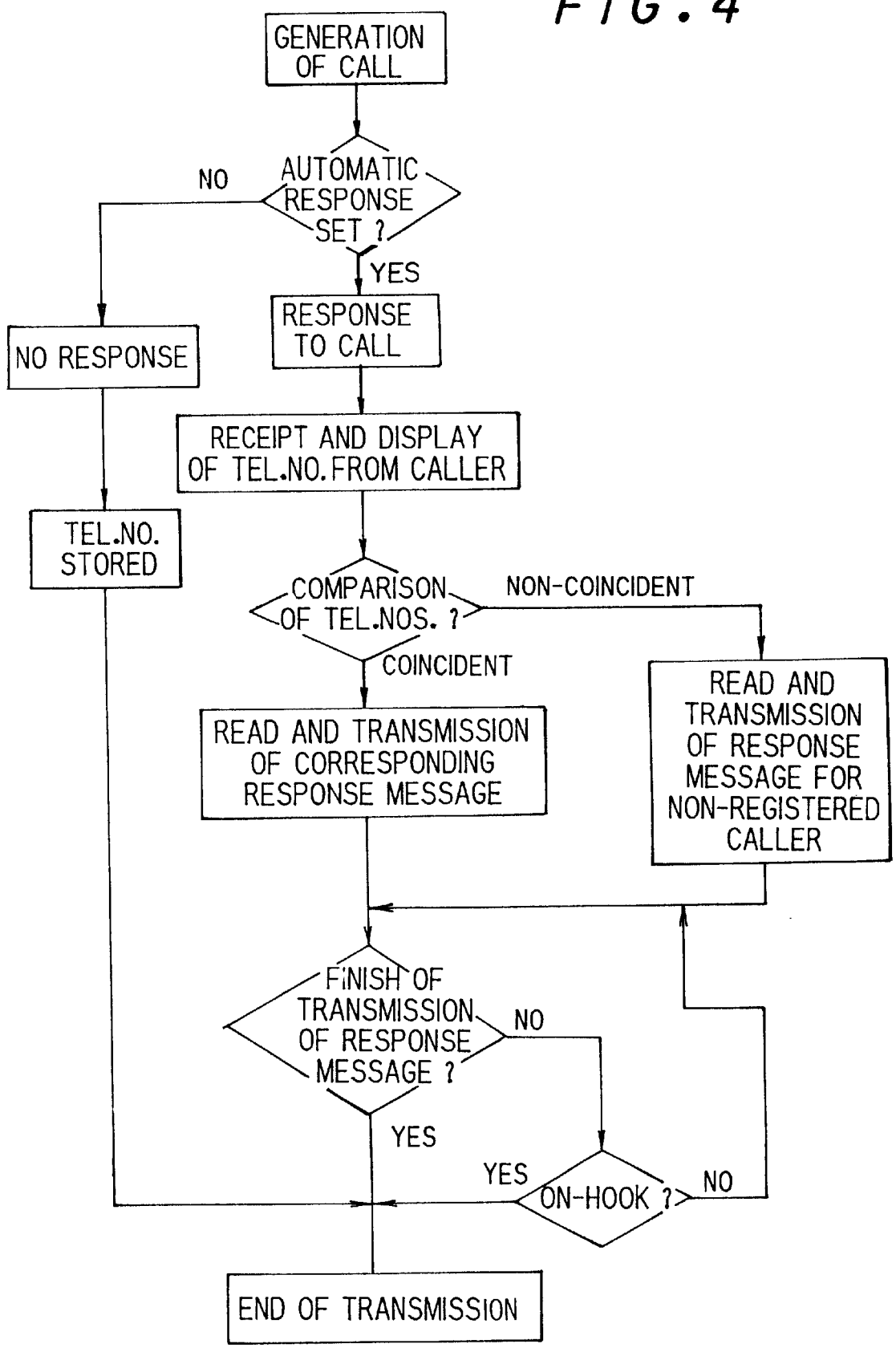
FIG. 4 is a flow chart showing operation in the preferred embodiment.

FIG. 1 shows a radio telephone system in the preferred embodiment which comprises a digital exchange unit 100 connected to plural telephone lines $10_1$, - - - $10_N$, fixed radio apparatus 200 connected via the telephone lines $10_{N1}$, - - - $10_N$ to the digital exchange unit 100, radio telephone apparatus 300 connected via radio telephone lines to the fixed radio apparatus 200.

FIG. 2 shows the radio telephone apparatus 300 comprises a radio transmitting and receiving unit 301, a base band circuit 302, a control unit 303, a telephone number memory 304, a display 305, an operation key unit 306, and a response message memory 307.

In the radio telephone apparatus 300, the radio transmitting and receiving unit 301 is an interface, by which control and communication signals are transmitted and received via the radio telephone line, the fixed radio apparatus 200 and the telephone line $10_1$ between the digital exchange unit 100 and the radio telephone apparatus 300.

The base band circuit 302 comprises a modem circuit for modulating a transmitting signal to be supplied to the transmitting and receiving unit 301 and demodulating a received signal supplied therefrom, a driver circuit for driving a speaker 308, and amplifier for amplifying a signal supplied from a microphone 309, and a memory for storing instructions and codes to transmit signals to and receive signals from the fixed radio apparatus 200.

The control unit 303 controls the radio transmitting and receiving unit 301 to select a radio telephone line, and transmit and receive data, the base band circuit 302 to transmit and receive a communication signal and a control signal, the display 305 to display visual information, the operation key unit 306 to supply key input information thereto, and other units in the radio telephone apparatus 300 to operate in the manner described below.

The telephone number memory 304 stores at least one telephone number group and at least one telephone number belonging to the telephone number group to be compared with a telephone number of a caller received via the telephone line $10_1$, the fixed radio apparatus 200, and the radio telephone line from the digital exchange unit 100.

The display 305 comprises LCDs or lamps for displaying the key input information, control state and the like.

The operation key unit 306 comprises dials and keys for input of instruction and data for the radio telephone apparatus 300 to operate as a radio telephone set.

The response message memory 307 stores at least one kind of a response message.

FIG. 3 shows one pattern; of telephone number groups and telephone numbers assigned to the telephone number groups which are stored in the telephone number memory 304. As clearly shown therein, "q" kinds of the telephone number groups, to each of which plural telephone numbers 1-1, 1-2, - - - 1-m, 2-1, 2-2, - - - 2-n, and A-1, A-2, - - - A-q, and numbers 1, 2, - - - q of the response messages are assigned, are store in the telephone number memory 304.

In operation, a call is generated in a telephone set for a caller, so that the call is transmitted from the digital exchange unit 100 via the telephone line $10_1$, the fixed radio apparatus 200, and the radio telephone line to the radio telephone apparatus 300.

In the radio telephone apparatus 300, information of the caller, that is, a telephone number of the caller which is received in the transmitting and receiving unit 301 is discriminated in the base band circuit 302, and the discriminated result is displayed on the display 305. When automatic response, that is, automatic answering function is set, the control unit 303 accesses the telephone number memory 304 to check as to whether the received telephone number is one of stored telephone numbers or not. When the received telephone number is coincided with one of the stored telephone numbers, one of the message number 1, 2 - - - q corresponding to the telephone number group, to which the received telephone number belongs, is read from the telephone number memory 304.

Then, the control unit 303 reads a response message from the response message memory 307 in accordance with the message number thus read from the telephone number memory 304. The response message thus read from the response message memory 307 is transmitted via the base band circuit 302 and the radio transmitting and receiving unit 301 to the caller. On the other hand, when the received message is not found in the telephone number memory 304, a response message which is not designated by the message numbers 1, 2 - - - q is read from the response message memory 307 for non-registered callers. Thus, the response message for the non-registered callers is transmitted to the caller in the same manner as the registered callers described above.

On the contrary, when the automatic response, that is, automatic answering function is not set, any message is not transmitted to the caller who only hears the absence tone of a callee, and the telephone number of the caller is stored in a no-response telephone number memory (not shown) in the radio telephone apparatus 300. When the number of telephone numbers to be stored into the no-response telephone number memory is over the storing capacity thereof, the oldest telephone number is erased to store the newest telephone number.

One example of the response message is "The engineers of NEC Corporation are kindly asked to give the results of the conference to Mr. Hayashi by the telephone number of 5933-1234".

In the preferred embodiment, when the operation of "off-hook" is not carried out during the transmission of the response message, the whole control is completed upon the termination of the response message transmission. On the other hand, when the off-hook is effected during the transmission of the response message, a callee can start telephone conversation with the caller subsequently to the interrupted transmission of the response message.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A radio telephone system, comprising:
   a radio telephone apparatus which comprises:
   a radio telephone set circuit for transmitting a first signal to a fixed radio apparatus and receiving a second signal therefrom;
   a response message memory for storing a plurality of response messages;
   a telephone number memory for storing a plurality of telephone numbers and one or more telephone groups, each of said one or more telephone groups including at least two of said plurality of telephone numbers; and
   a control unit for controlling said radio telephone set circuit to operate in signal transmitting and receiving modes;
   wherein said control unit comprises:
   a comparator comparing a telephone number of a caller included in information of said second signal received from said fixed radio apparatus with said plurality of telephone numbers stored in said telephone number memory, in an automatic response mode, to determine a coincident telephone number which coincides with said telephone number of a caller from among said plurality of telephone numbers stored in said telephone number memory,
   a reader reading one of said plurality of response messages from said response message memory corresponding to one of said one or more telephone groups which includes said coincident telephone number, and
   a first controller controlling said radio telephone set circuit to transmit the corresponding response message via said fixed radio apparatus to said caller, wherein said first controller transmits in a wireless mode.

2. A radio telephone system according to claim 1, wherein said control unit further comprises a second controller controlling said radio telephone set circuit to carry out telephone communication with a telephone set of said caller, said second controller performing an "off-hook" operation which is effected when a callee operates said telephone set of said radio telephone set circuit during transmission of one of said plurality of response messages, said transmission of said response message being terminated by said "off-hook" operation.

3. A radio telephone system, according to claim 1, wherein:

said control unit controls said radio telephone set circuit to transmit none of said plurality of response messages, when said control unit selects a non-response mode by canceling said automatic response mode.

4. A radio telephone set system, according to claim 3, wherein:

said telephone number of said caller is stored in a memory in said non-response mode.

5. A radio telephone set system, according to claim 1, wherein:

said fixed radio apparatus is connected via a telephone line to a digital exchange unit.

6. A radio telephone set system, according to claim 4, wherein:

said digital exchange unit is connected to a plurality of fixed radio apparatus by a plurality of telephone lines.

7. A radio telephone system according to claim 1, wherein said telephone number memory stores a plurality of telephone numbers and a plurality of telephone groups, each telephone group including a portion of said plurality of telephone numbers, wherein said reader reads at least one response message from said response message memory corresponding to one of said plurality of telephone groups including said telephone number stored based on said telephone number of said caller.

8. A radio telephone system according to claim 7, wherein each of said telephone groups is assigned a unique number which corresponds to a specific response message stored in said response message memory.

9. A radio telephone system according to claim 1, wherein said reader reads a standard response message from the response message memory when said telephone number of said caller fails to coincide with said telephone number stored.

10. A radio telephone system according to claim 1, wherein said control unit further comprises a second controller controlling said radio telephone set circuit to carry out telephone communication with a telephone set of said caller, said second controller performing an "off-hook" operation which is effected when a callee operates said telephone set of said radio telephone set circuit subsequent to an interruption of said transmission, said transmission of said response message being terminated by said "off-hook" operation, and further wherein said "off-hook" operation is not carried out during transmission of said response message.

11. A radio telephone for use in a radio telephone system, said radio telephone comprising:

means for storing a plurality of telephone numbers and at least one telephone group including a plurality of telephone numbers;

means for determining whether a telephone number of a caller included in information received by the radio telephone coincides with said telephone number stored in the radio telephone;

means for selecting a response message based upon a coincidence of said telephone number of said caller and one of said plurality of said telephone numbers stored determined by said means for determining;

means for transmitting a response which consists of a response message which has been selected by said means for selecting;

whereby an appropriate selected response is made to an incoming call request to the radio telephone based on said telephone number of said caller, and said means for transmitting transmits in a wireless mode.

12. A radio telephone, according to claim 11, further comprising:

a control means for selectively disabling said means for determining, said means for selecting, and said means for responding upon selection of a non-response mode.

13. A radio telephone, according to claim 11, further comprising:

means for storing a telephone number of a caller.

14. A method of providing an appropriate selected response to an incoming call to a radio telephone comprising the steps of:

storing in a telephone number memory a plurality of telephone numbers and at least one telephone group including at least two of said plurality of telephone numbers;

determining whether a telephone number of an incoming caller coincides with said telephone numbers stored within the radio telephone;

selecting one of a plurality of response messages based upon a coincidence of said telephone number of said caller with said telephone numbers stored which has been determined;

responding to said incoming call by transmitting said one of said response messages which has been selected based on said telephone number of said caller.

15. A method according to claim 14, comprising the further steps of:

storing within the radio telephone the telephone number of the caller; and removing one of said plurality of telephone numbers when a storage capacity is exceeded and no telephone number is older than said telephone number of said caller.

* * * * *